No. 735,536. PATENTED AUG. 4, 1903.
A. LEHMANN & E. SCHÖNHALS.
PHOTOLITHOGRAPHIC TRANSFER PLATE.
APPLICATION FILED SEPT. 9, 1901.
NO MODEL.
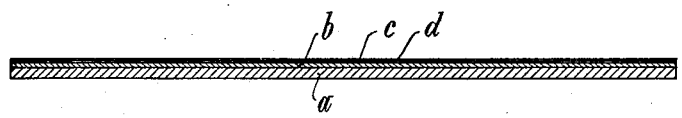
Witnesses:
H. W. Bormann.
M. Bormann.
Inventors:
Adolf Lehmann and
Edmund Schönhals.
By Hermann Bormann
Att'y.

No. 735,536. Patented August 4, 1903.

UNITED STATES PATENT OFFICE.

ADOLF LEHMANN AND EDMUND SCHÖNHALS, OF MOSCOW, RUSSIA.

PHOTOLITHOGRAPHIC TRANSFER-PLATE.

SPECIFICATION forming part of Letters Patent No. 735,536, dated August 4, 1903.

Application filed February 26, 1902. Serial No. 74,822. (No model.)

*To all whom it may concern:*

Be it known that we, ADOLF LEHMANN, residing at 18 Woronzow Pole, and EDMUND SCHÖNHALS, residing at Haus Ortschinnikow, Nowaja Basmannaja, in the city of Moscow and Empire of Russia, subjects of the Emperor of Russia, have invented an Improved Photolithographic Transfer-Plate, of which the following is a specification.

Our invention relates to an improved photolithographic transfer-plate designed for the use in making transfers direct upon the stone.

In the accompanying drawing we have shown a section of our transfer-plate.

For producing this photolithographic transfer-plate we glue upon a zinc or other supporting-plate $a$ $a$ thin layer $b$, of gum or other close-textured material, such as rubber fabric, leather, wax-taffeta, or cardboard with a rubber solution. The plate composed in this manner is coated with a layer $c$, of water-glass, dried at about 25° centigrade, and then covered with a layer $d$, formed of a solution of gelatin and potassium bichromate or similarly-acting substances, such as are employed in photomechanical printing. In some cases the supporting-plate $a$ and in other cases the layer $c$, of water-glass, may be dispensed with. After drying for some hours the plate is ready for use. For preparing the transfer-plate it is placed under a photographic negative, exposed to the light, washed with water, and dried, these operations being effected in the customary manner. The transfer-plate is inked with transfer-ink and being laid upon a stone is passed with the same through a press. By this means a transfer is produced direct upon a stone, is fixed, and then serves for printing in the customary manner in lithography.

A transfer-plate has already been tried which has the autotype film provided upon a thin sheet of metal; but this does not and, in fact, cannot give satisfactory results, it being impossible to transfer from a hard and smooth metal plate onto hard stone without squeezing the soft layer of gelatin of the negative entirely out of shape or tearing the same on the application of the powerful pressure required. It may also be mentioned that autotype prepared in somewhat similar manner have been employed, like rubber stamps, for printing direct upon ceramic products; but they are differently constructed and quite unsuitable for the transfer upon lithographic stone. The layer of rubber used in that case is generally very thick—about five-sixteenths of an inch—and consists of two plates vulcanized to different degrees and of which the upper plate, carrying the film of gelatin, is not extensible, being hard and possessing slight elastic properties. Thus a hard and smooth plate comes in contact with the hard stone, so that the picture will be distorted by the strong pressure. On the other hand, the improved transfer-plate produced according to our said invention has an elastic soft layer either interposed between the metal and sensitive layer or provided at the back of the latter, thereby obviating the serious drawbacks hereinbefore referred to.

What we claim as our invention, and desire to secure by Letters Patent, is—

The herein-described photolithographic transfer-plate, consisting of a flexible metallic plate, a sensitive layer, and an interposed thin soft and elastic layer of rubber, substantially as and for the purpose specified.

In testimony whereof we have signed our names to this specification in the presence of two subscribing witnesses.

ADOLF LEHMANN.
EDMUND SCHÖNHALS.

Witnesses:
GUSTAVE HARTWIG,
JEAN MARC.